US005546750A

United States Patent [19]

Richer

[11] Patent Number: 5,546,750

[45] Date of Patent: Aug. 20, 1996

[54] HYDRAULIC CIRCUIT FOR PRESSURE-CONTROLLING A HYDRAULIC DISTRIBUTOR OF THE OPEN-CENTER TYPE

[75] Inventor: Emmanuel Richer, Bourgoin Jallieu, France

[73] Assignee: Rexroth-Sigma, France

[21] Appl. No.: 474,144

[22] Filed: Jun. 7, 1995

Related U.S. Application Data

[63] Continuation of Ser. No. 85,941, Jul. 6, 1993, abandoned.

[30] Foreign Application Priority Data

Jul. 3, 1992 [FR] France .................................. 92 08242

[51] Int. Cl.[6] ............................ F16D 31/02; F15B 11/00

[52] U.S. Cl. ................................ 60/426; 60/452; 60/468; 60/494; 91/517; 91/518

[58] Field of Search ............................ 60/422, 426, 460, 60/450, 452, 494, 468; 91/461, 514, 517, 518

[56] References Cited

U.S. PATENT DOCUMENTS

| | | | |
|---|---|---|---|
| 3,815,477 | 6/1974 | Ailshie et al. . | |
| 3,883,023 | 5/1975 | Bernhoft | 91/517 X |
| 4,020,867 | 5/1977 | Sumiyoshi | 91/514 X |
| 4,089,169 | 5/1978 | Miller | 60/450 X |
| 4,325,410 | 4/1982 | Bernhardt et al. . | |
| 4,372,193 | 2/1983 | Hau | 31/518 X |
| 4,479,349 | 10/1984 | Westveer | 60/450 X |
| 4,617,854 | 10/1986 | Kropp | 91/517 |
| 4,914,913 | 4/1990 | St. Germain et al. | 60/450 X |
| 4,953,447 | 9/1990 | Bender | 91/514 |

*Primary Examiner*—Hoang Nguyen
*Attorney, Agent, or Firm*—Larson and Taylor

[57] ABSTRACT

A control device provides a reliable way of pressure controlling a hydraulic distributor and an associated first hydraulic circuit when pressurized hydraulic fluid is simultaneously supplied to at least one other hydraulic circuit. Pilot pressure oil enters and exits the distributor through inlet and outlet passages in the pilot line. An apparatus for regulating pilot oil flow rate is interposed between the pilot line inlet passage and the hydraulic fluid line. The device includes a pressure head detection apparatus having inlet ends connected to the pilot line inlet passage and to the hydraulic circuit and an outlet end connected to the hydraulic fluid source for controlling the flow rate of the hydraulic fluid based on the highest pressure requirement.

5 Claims, 3 Drawing Sheets

HYDRAULIC CIRCUIT FOR PRESSURE-CONTROLLING A HYDRAULIC DISTRIBUTOR OF THE OPEN-CENTER TYPE

This application is a continuation of application Ser. No. 08/085,941 filed Jul. 6, 1993 (now abandoned).

FIELD OF THE INVENTION

The present invention generally relates to the field of hydraulic control and more precisely it relates to a hydraulic circuit for controlling pressure to a hydraulic distributor of the open-center type, including a signal line, the pressure-control circuit being associated with another hydraulic circuit and the two circuits being supplied by a common source of pressurized hydraulic fluid with variable flow rate.

SUMMARY OF THE INVENTION

The object of the invention is essentially to provide a reliable way of controlling pressure to a hydraulic distributor of the open-center type when the latter is hydraulically combined with at least one other hydraulic circuit which particularly, for its part, may not be of the controlled pressure type (for example servo assistance, flow-rate-controlled distributor, etc.), the means proposed further having to demonstrate that it is very flexible in use and that it can give rise to different embodiment variants of various technological complexities, and therefore having different production costs, capable of satisfying the varied specific requirements of the users.

To these ends, a hydraulic circuit such as defined in the preamble, being set out in accordance with the invention, is essentially characterized in that to the signal line pilot inlet passage through which pilot pressure oil enters the distributor are connected constant signal flow rate regulating means which are interposed between the signal line inlet and a main hydraulic line supplied by the source and connected to a main inlet of the distributor.

In a first possible embodiment relating to the case where the hydraulic distributor of the open-center type is provided with supply slits whose progressive nature of closing is sufficient to provide the progressive response of the hydraulic distribution in the event of a plurality of distributors being mounted in parallel, it is desirable for the constant flow rate regulating means to comprise a flow rate regulator whose inlet is connected to the main hydraulic line and whose outlet is connected to the signal line inlet of the distributor. The flow rate regulator is then capable of providing the desired progressive nature of the pressure response when the distribution baffle is closed and of guarding against cavitation when the slide valve is in the neutral position.

In another embodiment which could be used when the distributor is provided with supply slits which are not designed to give the desirable progressive response, the constant flow rate regulating means may comprise restriction means interposed between the main hydraulic line and the signal line inlet passage and means for maintaining a constant pressure differential arranged in the main hydraulic line upstream of the connection of the restriction means, these means for maintaining a constant pressure differential having their control inlet connected to a line for controlling the hydraulic source by detecting pressure head, with this line itself connected to the signal line inlet of the distributor.

If the open-center hydraulic distributor is not to absorb all the flow of hydraulic fluid coming from the source, it is then desirable to provide other restriction means arranged in the main hydraulic line between the means for maintaining a constant pressure differential, and the connection of the above-mentioned first restriction means to the main hydraulic line.

If, on the other hand, the source of pressurised hydraulic fluid is not provided with a suitable means for regulating the pressure (for example if the source is a variable discharge pump which is not of the type which maintains maximum pressure), it is then desirable furthermore to provide means for limiting the signal pressure connected to the above-mentioned pressure head detection line, downstream of the connection of the above-mentioned means for maintaining a constant pressure differential, and yet other restriction means arranged in the pressure head detection line between the connection of the means for maintaining a constant pressure differential on the line and the signal line inlet.

The implementation means in accordance with the invention therefore make it possible to effect a control of the pressure of an open-center hydraulic distributor which control may be perfectly designed for the specific needs of the users as a function of the regulation quality which these users wish to obtain, the cost of the circuits then being a function of the number of components used and therefore of the technological complexity of the regulation.

BRIEF DESCRIPTION OF THE DRAWINGS

The invention will be better understood on reading the detailed description of some preferred embodiments given solely by way of non-limiting examples. In this description, reference will be made to the appended drawings in which.

DESCRIPTION OF THE PREFERRED EMBODIMENTS

The same numerical references have been retained in all the figures for denoting the same items.

Figure 1:
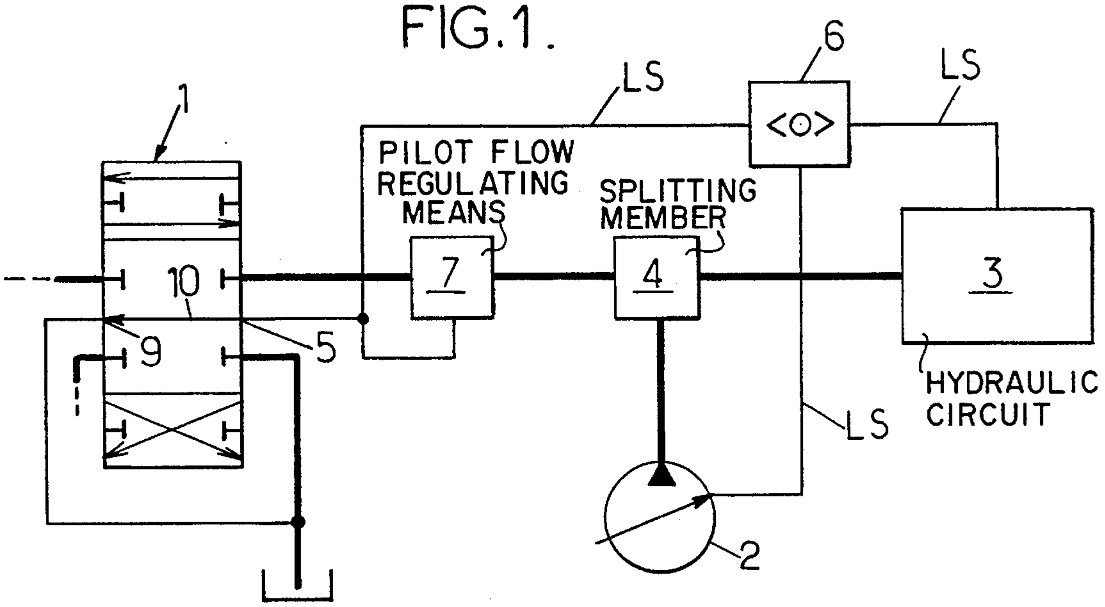
FIG. 1 is a very diagrammatic representation of a hydraulic circuit set out in accordance with the invention.

Referring first of all to the diagram of FIG. 1, the numerical reference 1 denotes a hydraulic distributor of the open-center type the control of the pressure of which constitutes the subject of the invention, whilst the distributor is supplied with hydraulic fluid by a variable flow-rate source (here specifically a variable-discharge pump 2) at the same time as the latter supplies another hydraulic circuit 3 (shown diagrammatically in the form of a rectangle). This other hydraulic circuit 3 may, for its part, not be pressure-controlled. A splitting member 4, of any suitable type known to the person skilled in the art (for example a simple T connection, or a priority flow-rate divider for example associated with servo assistance then constituting the other circuit 3), is interposed between the hydraulic source 2 on the one hand, and the distributor 1 and the additional circuit 3, on the other hand, so as to split the hydraulic fluid between the latter.

The variable flow rate source is controlled, as a function of the requirements of the highest pressure head, by a pressure head detection line LS coming from signal line inlet 5 of the distributor 1, on the one hand, and from the circuit 3, on the other hand, by the use of a selector means 6 capable of selecting and directing towards the control input of the source 2 the highest of the pressures detected.

To the signal line inlet passage 5 there are connected constant flow rate regulating means 7 which are interposed between the signal line inlet passage 5 of the distributor and the main hydraulic line 8 which is supplied by the hydraulic source 2 via the splitter 4 and which is connected to a main inlet of the distributor.

As for the signal line output 9 of the signal line of the line 10 the distributor 1, it is connected to the tank.

By virtue of the set-up which has just been described, the progressive nature of the pressure variation at signal line inlet 5 as the distribution baffle closes may be provided by a very simple system.

Figure 2:
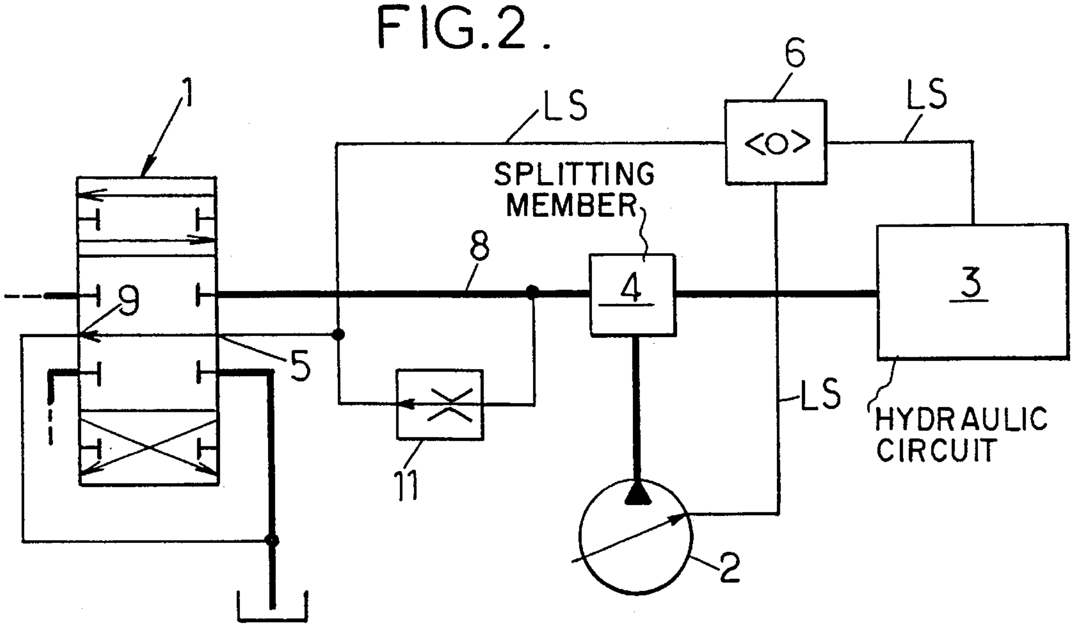
FIGS. 2 to 5 are diagrams illustrating specific embodiment variants of the general diagram of FIG. 1.

FIG. 2 represents a first specific embodiment in which the constant flow rate regulating means 7 comprise a flow rate regulator 11 whose inlet is connected to the main hydraulic line 8 and whose outlet is connected to the signal line inlet. Such a circuit set-up will be used, in particular, in the case where the distributor 1 is provided with supply slits whose progressive nature of closing as the distribution baffle closes is sufficient to give the progressive response of the distribution in the event of a plurality of distributors being mounted in parallel. The flow rate regulator 11 then provides the desired progressive response of the pressure when the distribution baffle is closed, and guards against cavitation when the slide valve of the distributor is in the neutral position. The pressure is therefore limited by the pressure regulator commonly incorporated into the variable discharge pump 2.

From the technological point of view, the flow rate regulator 11 (just like the selector means 6, moreover) may be integrated into the inlet element of the distributor 1.

The example which has just been described constitutes a simple solution for controlling movements of a machine equipped with a single variable pump with servo assistance of the type with pressure head detection (LS), for example for equipping small loading machines.

Figure 3:
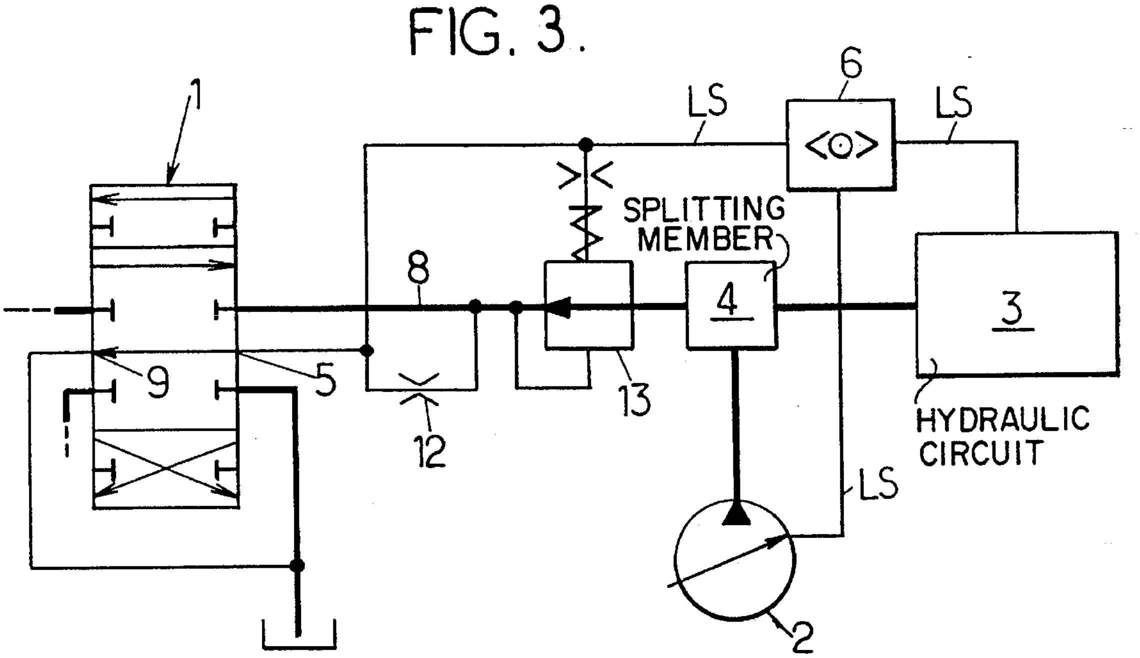

In FIG. 3, the constant flow rate regulating means comprise restriction means such as a nozzle 12 whose inlet is connected to the main hydraulic line 8 and whose outlet is connected to the signal line inlet 5 of the distributor 1, as well as means 13 for maintaining a constant pressure differential, such as a pressure balance, arranged in the main line 8, upstream of the inlet connection of the nozzle 12, and intended to maintain a constant pressure differential in the measurement nozzle 12 during the regulating phases; the control inlet 14 of this pressure balance is connected to the line LS of the distributor 1, via a restriction. This assembly may be used when the progressive nature of the supply slits of the distributor 1 is insufficient to provide the progressive response of the distribution in the event of a plurality of distributors being used in parallel.

Figure 4:
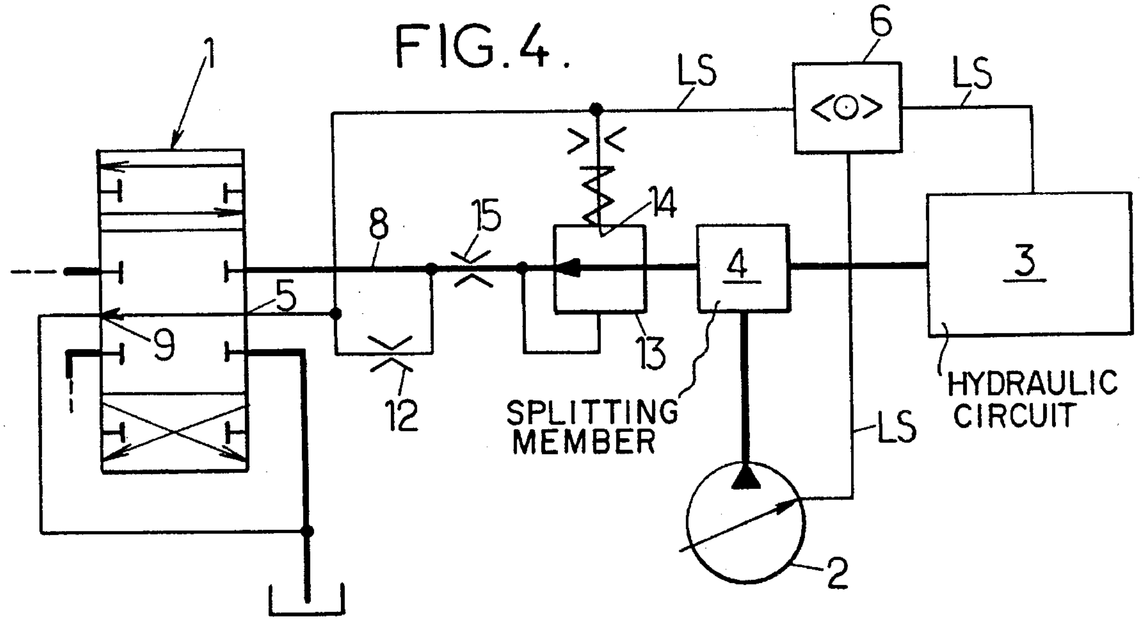

On the basis of the above-mentioned diagram, if the distributor 1 is not to absorb all the flow of hydraulic fluid coming from the pump 2, then other restriction means such as a nozzle 15 (FIG. 4) are provided in the main hydraulic line 8, between the pressure balance 13 and the inlet connection of the first nozzle 12.

Figure 5:
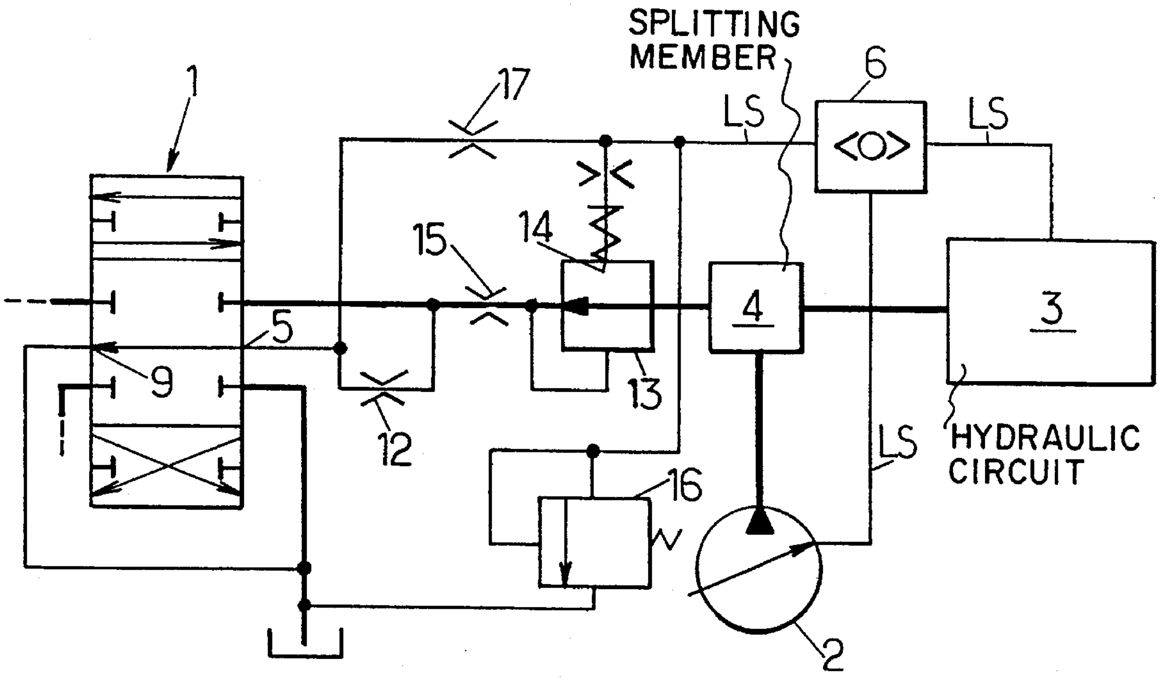

Finally, if the variable discharge pump 2 is not equipped with a maximum pressure regulator, then means 16 (which may consist of a pressure limiting device) for limiting the signal pressure are provided (FIG. 5) connected to the line LS of the distributor 1, between the control inlet connection 14 of the balance 13 and the selector means 6, as well as yet other restriction means such as a nozzle 17 arranged in the line LS of the distributor 1 between the signal line inlet passage 5 of the distributor and the control inlet connection 14 of the balance 13.

As goes without saying, and, moreover, as a result of the foregoing, the invention is in no way limited to those of its application modes and embodiments which have been envisaged more particularly; on the contrary, it encompasses all the variants thereof.

I claim:

1. A control circuit for controlling a pressure of hydraulic fluid to a hydraulic distributor associated therewith and to a separate hydraulic circuit, comprising:

a variable flow rate hydraulic fluid source for simultaneously supplying pressurized hydraulic fluid to the hydraulic distributor and to the separate hydraulic circuit;

a main hydraulic fluid line connecting said fluid source to a main inlet of the hydraulic distributor;

a signal line through the distributor having an inlet and an outlet, said signal line being closed as a spool of the distributor is moved upon actuation of the hydraulic distributor from a neutral position;

a flow rate regulating means for providing a constant hydraulic fluid flow rate therethrough, said flow rate regulating means being connected from said main hydraulic fluid line to said inlet of said signal line such that a pressure of the hydraulic fluid in said signal line increases as the spool moves from a neutral position; and a pressure head detection means, connected by a first load sensing line to said inlet of said signal line and by a second load sensing line to the separate hydraulic circuit, (a) for detecting a highest fluid pressure between a fluid pressure at said inlet of said signal line and a fluid pressure in said separate hydraulic circuit and (b) for controlling the flow rate of the hydraulic fluid source as a function of the highest pressure detected.

2. A control circuit according to claim 1, wherein the flow rate regulating means comprises a flow rate regulator having an inlet end connected to the main hydraulic fluid line and an outlet end connected to the inlet of said signal line.

3. A control circuit according to claim 1, wherein the flow rate regulating means comprises (a) a first restriction means connecting the main hydraulic fluid line to the inlet of said signal line for restricting flow to said signal line and (b) a means for maintaining a constant pressure differential between said first load sensing line and said main hydraulic fluid line, said means for maintaining a constant pressure differential being positioned in the main hydraulic fluid line upstream of a connection of the first restriction means to the main hydraulic fluid line, and said means for maintaining a constant pressure differential having a control inlet connected to said first load sensing line.

4. A control circuit according to claim 3, further comprising a second restriction means for restricting flow positioned in the main hydraulic fluid line between the means for maintaining a constant pressure differential and the connection of the first restriction means to the main hydraulic fluid line.

5. A control circuit according to claim 4, further comprising a means for limiting pressure connected to said first load sensing line downstream of the connection of the means for maintaining a constant pressure differential, and a third restriction means for restricting flow positioned in said first load sensing line between the connection of the means for maintaining a constant pressure differential and the inlet of said signal line.

* * * * *